US008594688B2

(12) United States Patent
Barbieri et al.

(10) Patent No.: US 8,594,688 B2
(45) Date of Patent: Nov. 26, 2013

(54) METHOD AND SYSTEM FOR RATE PREDICTION IN COORDINATED MULTI-POINT TRANSMISSION

(75) Inventors: Alan Barbieri, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 12/962,581

(22) Filed: Dec. 7, 2010

(65) Prior Publication Data
US 2011/0306350 A1    Dec. 15, 2011

Related U.S. Application Data

(60) Provisional application No. 61/285,064, filed on Dec. 9, 2009.

(51) Int. Cl.
*H04B 7/24* (2006.01)
(52) U.S. Cl.
USPC ............................ 455/450; 370/312; 370/329
(58) Field of Classification Search
USPC ..................... 455/450, 422.1, 452.1; 370/252
See application file for complete search history.

(56) References Cited

U.S. PATENT DOCUMENTS

| 2010/0034146 | A1  | 2/2010 | Hou et al. | |
| 2012/0071187 | A1* | 3/2012 | Karaoguz et al. | 455/509 |
| 2012/0082058 | A1* | 4/2012 | Gerstenberger et al. | 370/252 |

FOREIGN PATENT DOCUMENTS

| WO | WO2009082179 A2 | 7/2009 |
| WO | WO2009084905 A2 | 7/2009 |
| WO | WO2011022733 A2 | 2/2011 |

OTHER PUBLICATIONS

International Search Report and Written Opinion—PCT/US2010/059753, ISA/EPO—Jul. 7, 2011.
Qualcomm Europe: "Feedback considerations for DL MIMO and CoMP", 3GPP Draft; R1-093131 Feedback Considerations for DL MIMO and COMP, 3rd Generation Partnership Project (3GPP), Mobile Competence Centre ; 650, Route Des Lucioles ; F-06921 Sophia-Antipolis Cedex ; France, no. Shenzhen. China; 20090819, Aug. 19, 2009, XP050351500, [retrieved on Aug. 19, 2009].

* cited by examiner

*Primary Examiner* — Phuoc Doan
(74) *Attorney, Agent, or Firm* — Steven A. Raney

(57) ABSTRACT

A downlink cooperative multi-point (CoMP) framework of a wireless communication system reduces inter-node interference and increases channel gain by scheduling a user equipment (UE) based on improved interference estimates and gain estimates. The UE computes a gain scaling factor ($\mu$) based on theoretical gain and actual gain for each available scheduling scenario and transmits the gain scaling factors to an anchor node of the UE's radio reporting set (RRS). The anchor node computes an internal scaling factor ($v$) based on the received gain scaling factors ($\mu$) to estimate an actual gain for the scheduling scenarios. The UE also periodically transmits quantized interference estimates to the anchor node. The anchor node predicts a rate for the scheduling scenarios and schedules the UE based on the internal scaling factor ($v$), the gain scaling factors ($\mu$), and the interference estimates.

36 Claims, 16 Drawing Sheets

METHOD AND SYSTEM FOR RATE PREDICTION IN COORDINATED MULTI-POINT TRANSMISSION

CROSS REFERENCE TO RELATED APPLICATION

This application claims the benefit of U.S. Provisional Patent Application No. 61/285,064, entitled "Method and System for Rate Prediction in Coordinated Multi-Point Transmission," filed on Dec. 9, 2009, the disclosure of which is expressly incorporated by reference herein in its entirety.

FIELD

Aspects of the present disclosure relate generally to wireless communication systems, and more particularly to a coordinated multi-point network and protocol architecture.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where. Each of the NS independent channels corresponds to a dimension. The MIMO system can provide improved performance (e.g., higher throughput and/or greater reliability) if the additional dimensionalities created by the multiple transmit and receive antennas are utilized.

SUMMARY

Aspects of the present disclosure include a system and method of wireless communication including determining a gain scaling parameter ($\mu$) by a UE based on a theoretical maximum gain for a combined spatial channel of a Coordinated Multi-Point (CoMP) radio reporting set (RRS) of the user equipment (UE) and an actual received power for a transmission on the combined spatial channel. The method also includes transmitting the at least one gain scaling parameter ($\mu$) to at least one node of the radio reporting set.

Aspects of the disclosure also include a system and method of wireless communication including receiving a gain scaling parameter ($\mu$) of a user equipment (UE) by an eNB for a combined spatial channel of a Coordinated Multi-Point (CoMP) radio reporting set (RRS) of the user equipment (UE) and determining by the eNB, an internal scaling parameter ($\nu$) by the eNB, based on the gain scaling parameter ($\mu$). An actual gain is estimated by the eNB based on a theoretical maximum gain for the combined spatial channel, which accounts for the received gain scaling parameter ($\mu$), and the internal scaling parameter ($\nu$).

Aspects of the present disclosure also include a system and method of wireless communication including estimating, by a user equipment (UE), an interference level of a combined spatial channel of a Coordinated Multi-Point (CoMP) radio reporting set (RRS) of the UE; and transmitting to an anchor node one or more quantized estimated interference levels.

Aspects of the present disclosure also include a system and method of wireless communication including receiving a number of quantized interference level estimates by an eNB for combined spatial channels of a Coordinated Multi-Point (CoMP) radio reporting set (RRS) for multiple user equipments (UEs) and predicting a rate by the eNB for at least one of the UEs based on the received quantized interference level estimates.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Figure 1:
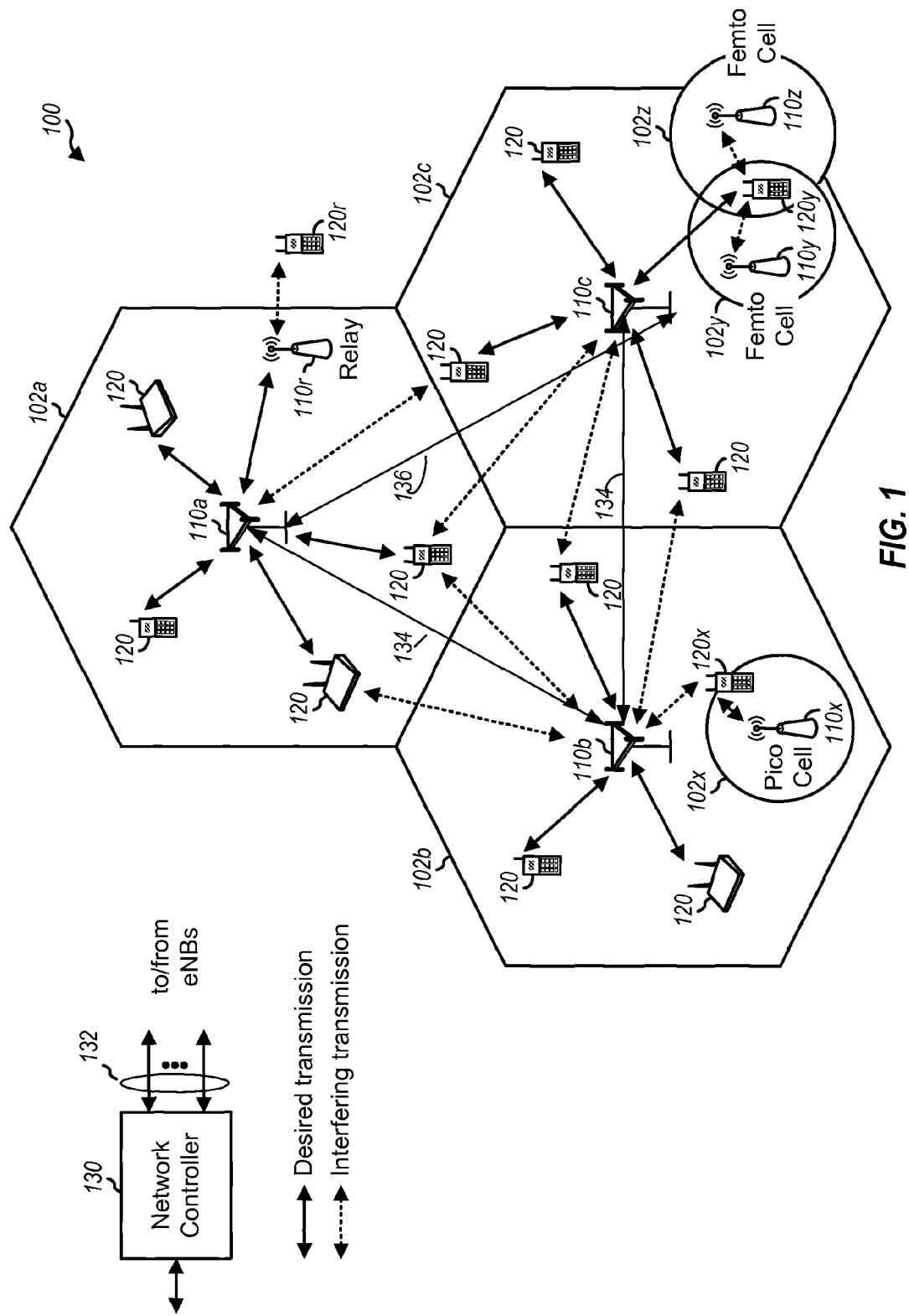
FIG. 1 illustrates an example multiple access wireless communication system according to one embodiment.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 also includes relay stations. A relay station is a station that receives a transmission of data and/or other information from an upstream station (e.g., an eNodeB, a UE, or the like) and sends a transmission of the data and/or other information to a downstream station (e.g., another UE, another eNodeB, or the like). A relay station may also be a UE that relays transmissions for other UEs. In the example shown in FIG. 1, a relay station 110r may communicate with the eNodeB 110a and a UE 120r, in which the relay station 110r acts as a relay between the two network elements (the eNodeB 110a and the UE 120r) in order to facilitate communication between them. A relay station may also be referred to as a relay eNodeB, a relay, and the like.

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul 132. The eNodeBs 110 may also communicate with one another, e.g., directly or indirectly via a wireless backhaul 134 or a wireline backhaul 136 using an interface such as an X2 interface.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
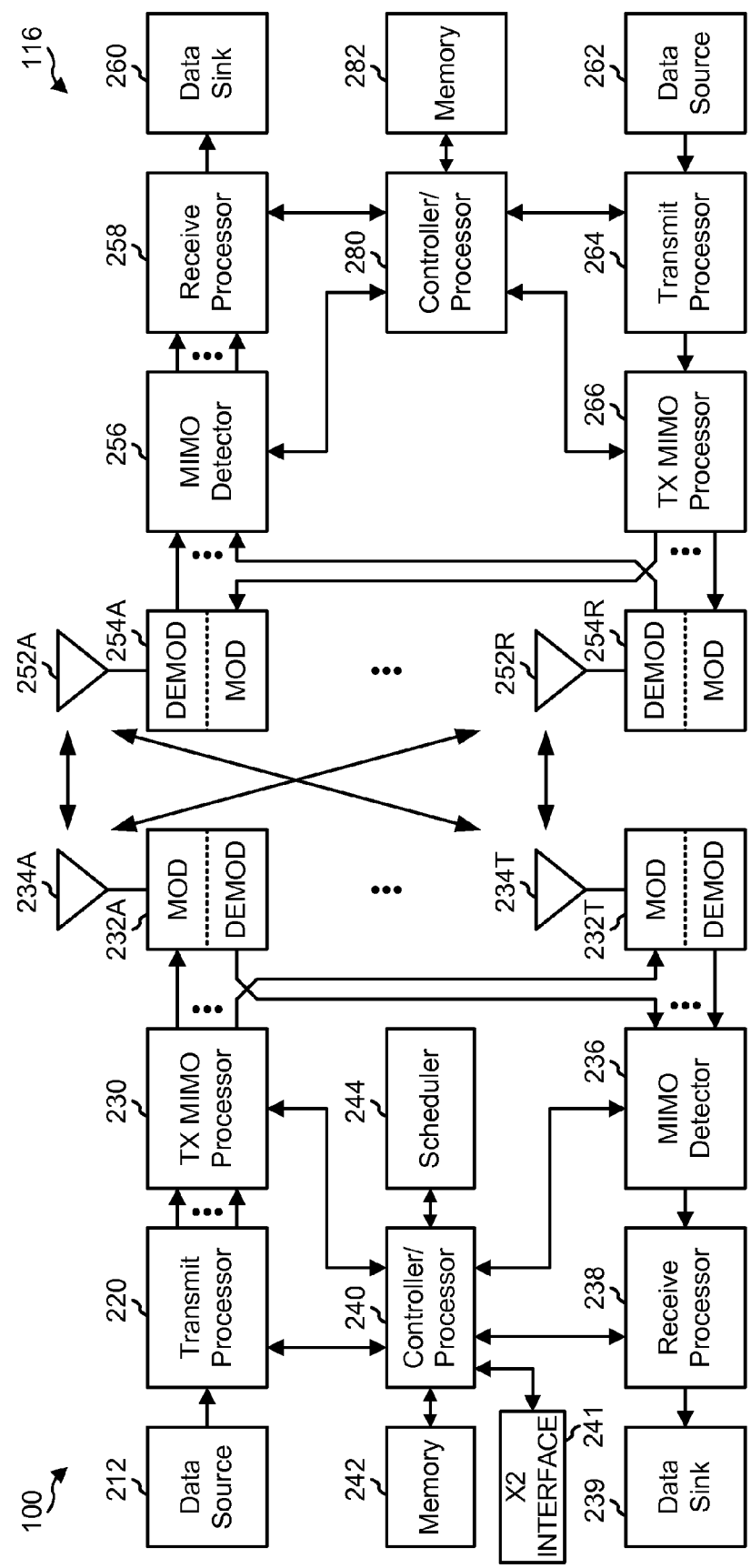
FIG. 2 illustrates an example block diagram of a transmitter system (also known as the eNodeB) and a receiver system (also known as user equipment (UE)) in a multiple input multiple output (MIMO) system.

FIG. 2 shows a block diagram of a design of a base station/eNB 110 and a UE 116, which may be one of the base stations/eNBs and one of the UEs in FIG. 1. For a restricted association scenario, the base station 110 may be the macro eNB 110c in FIG. 1, and the UE 116 may be the UE 116. The base station 110 may also be a base station of some other type. The base station 110 may be equipped with antennas 234a through 234t, and the UE 116 may be equipped with antennas 252a through 252r.

At the base station 110, a transmit processor 220 may receive data from a data source 212 and control information from a controller/processor 240. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 116, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 116 to a data sink 260, and provide decoded control information to a controller/processor 280.

On the uplink, at the UE 116, a transmit processor 264 may receive and process data (e.g., for the PUSCH) from a data source 262 and control information (e.g., for the PUCCH) from the controller/processor 280. The processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 110. At the base station 110, the uplink signals from the UE 116 may be received by the antennas 234, processed by the modulators 232, detected by a MIMO detector 236 if applicable, and further processed by a receive processor 238 to obtain decoded data and control information sent by the UE 116. The processor 238 may provide the decoded data to a data sink 239 and the decoded control information to the controller/processor 240.

The controllers/processors 240 and 280 may direct the operation at the base station 110 and the UE 116, respectively. The processor 240 and/or other processors and modules at the base station 110 may perform or direct the execution of various processes for the techniques described herein. The processor 280 and/or other processors and modules at the UE 116 may also perform or direct the execution of the functional blocks illustrated in FIGS. 4 and 5, and/or other processes for the techniques described herein. The memories 242 and 282 may store data and program codes for the base station 110 and the UE 116, respectively. A scheduler 244 may schedule UEs for data transmission on the downlink and/or uplink. An X2 interface 241 may enable communications between the base station 110 and other base stations (such as those shown in FIG. 1.

A downlink FDD frame structure used in LTE/-A may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE/-A, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNodeB may send a Physical HARQ Indicator Channel (PHICH) and a Physical Downlink Control Channel (PDCCH) in the first M symbol periods of each subframe. The PDCCH and PHICH are also included in the first three symbol periods. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

An exemplary FDD and TDD (non-special subframe only) subframe structure in uplink long term evolution (LTE) communications includes available resource blocks (RBs) for the uplink partitioned into a data section and a control section. The control section may be formed at the two edges of the system bandwidth and may have a configurable size. The resource blocks in the control section may be assigned to UEs for transmission of control information. The data section may include all resource blocks not included in the control section. The data section includes contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency. According to one aspect, in relaxed single carrier operation, parallel channels may be transmitted on the uplink resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 3:
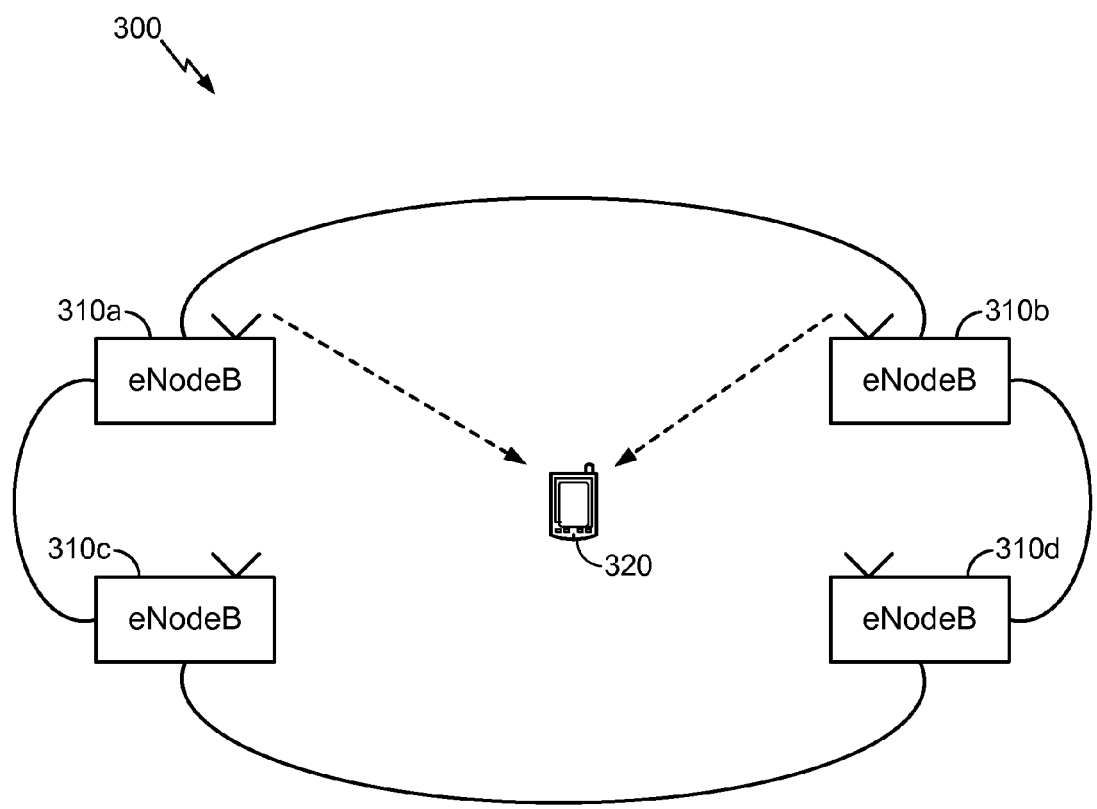
FIG. 3 illustrates an example coordinated multi point (CoMP) scenario with multiple eNodeBs transmitting to a user equipment.

In one embodiment, LTE-A includes a coordinated multi point (CoMP) transmission feature. This feature provides an interference mitigation technique for improving overall communication performance. In this technique, multiple eNodeBs, also known as base stations, collaborate. In certain types of CoMP, the eNodeBs transmit simultaneously the same information in parallel to one or more UEs or mobile stations to improve overall communication performance. FIG. 3 illustrates an example coordinated multi point (CoMP) scenario 300 with multiple eNodeBs transmitting to a user equipment 320. The multiple eNodeBs 310a, 310b, 310c, 310d are capable of communicating with each other as indicated by the lines connecting the multiple eNodeBs. In one embodiment, each of the eNodeBs can communicate with any of the other eNodeBs. For example, the eNodeB 310a is capable of communicating with any of the eNodeBs 310b, 310c, and 310d. One skilled in the art would understand that the quantities of eNodeBs and UE shown are for illustration only and that other quantities are possible without limiting the scope or spirit of the present disclosure.

In one example, CoMP transmission may improve the received Signal-to-Interference plus Noise Ratio (SINR), and thus, data rate, through enhanced spatial multiplexing or interference reduction through coordinated action by multiple eNodeBs. However, such coordination typically requires tight synchronization and message exchanges among the coordinating eNodeBs.

In one embodiment, the CoMP system includes of a variety of sets. For example, a CoMP Cooperating Set (CCS) is a set of geographically separated points directly or indirectly participating in PDSCH (physical downlink shared channel) transmission to the UE. The CCS may or may not be transparent to the UE. As another example, CoMP Transmission Points (CTPs) are a set of points which are actively transmitting the PDSCH to a UE. In general, CTPs are a subset of CCS (i.e., not all members of the CCS may be actively transmitting). As another example, a Measurement Set (MS) is a set of cells for which channel state or statistical information related to their link to the UE is reported. In one example, the MS may be the same as the CCS. In another example, actual UE reports may down-select cells for which actual feedback information is transmitted. In another example, a RRM Measurement Set (RMS), to support Radio Resource Management (RRM) measurements may be used for long-term channel state information.

Feedback techniques for the support of downlink CoMP may be characterized into three categories: explicit feedback, implicit feedback, and UE transmission of Sounding Reference Signals (SRS). For explicit feedback, information as observed by the receiver is sent back to the transmitter without assuming any transmitter or receiver processing. With implicit feedback, information is sent back to the transmitter that use hypotheses of different transmission and/or reception processing (e.g., channel quality indication (CQI), precoder matrix indication (PMI), and rank indication (RI)). User equipment transmissions of Sounding Reference Signals (SRS) may be used for Channel State Information (CSI) estimation at an eNodeB exploiting channel reciprocity.

In one example, a cyclic prefix may be added to a transmission waveform. A cyclic prefix is a redundant copy of an ending portion of a transmission waveform which is placed at a beginning portion of a transmission waveform to protect against multipath distortion at the receiver. In another aspect, the addition of a cyclic prefix to a transmission waveform may not always protect the useful portion of a received signal. The useful portion is that part of the received signal which contains the desired information bits. For example, if the useful portion of a received signal lies beyond the span of the cyclic prefix, significant performance degradation may result. Thus, the useful portions of signals should be aligned in time within a cyclic prefix window to obtain full performance benefit from CoMP.

The CoMP transmission may be separated into three categories: coordinated scheduling/beamforming (CS/CB), dynamic Cell selection (DCS), and joint transmission (JT). In coordinated scheduling/beamforming, data is only available at the serving cell but user scheduling/beamforming decisions are made with coordination among cells corresponding to the CoMP Cooperating Set (CCS). Dynamic cell selection and joint transmission are both a type of joint processing. In dynamic cell selection (DCS), the PDSCH transmission is from one point at a time within a CoMP cooperating set (CCS). In joint transmission, the PDSCH transmission is from multiple points (part of an entire CoMP cooperating set) at a time. More particularly, data to a single UE is simultaneously transmitted from multiple transmission points.

Figure 4:
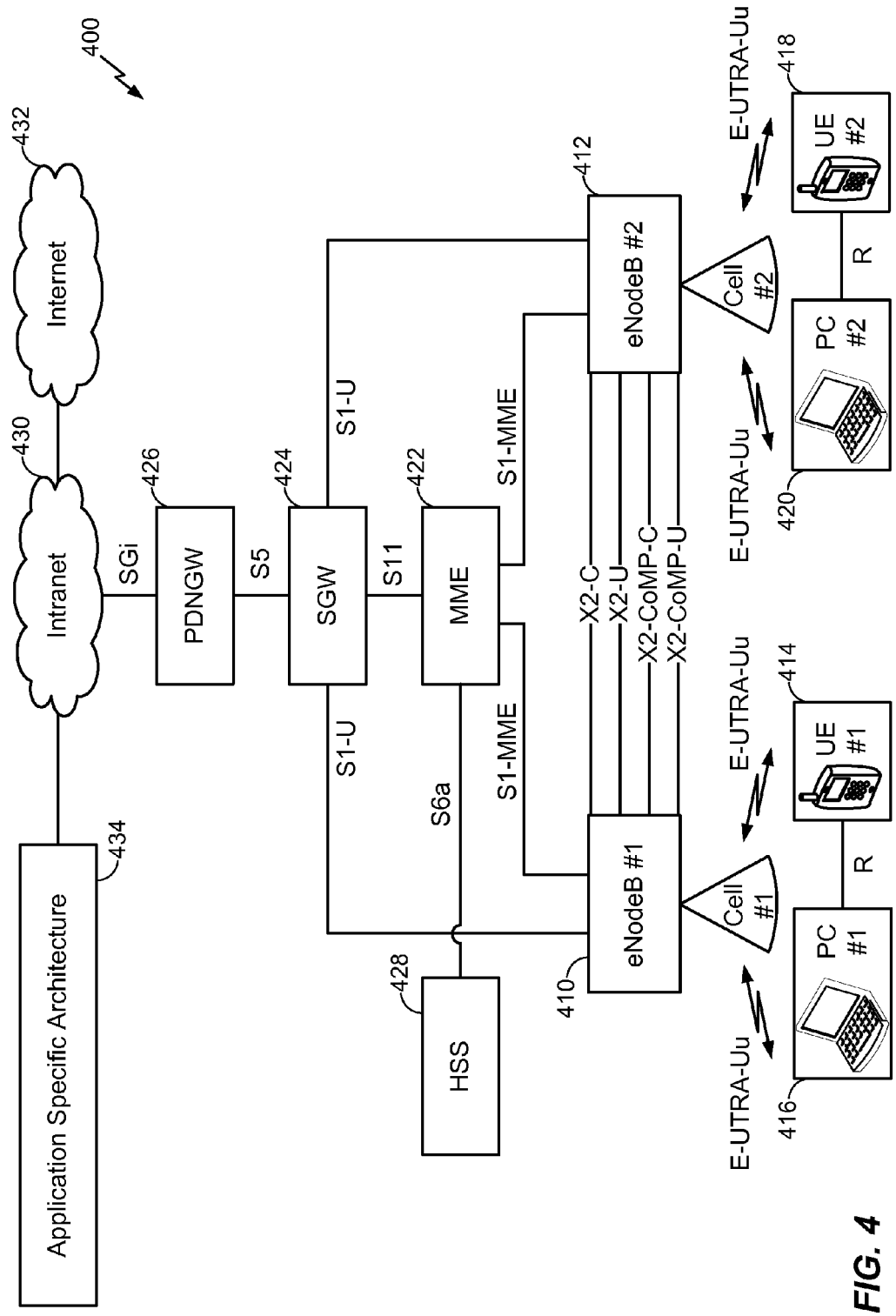
FIG. 4 illustrates an example Long Term Evolution (LTE) downlink CoMP network architecture.

FIG. 4 illustrates an example LTE downlink CoMP network architecture 400. The example is illustrated for downlink CoMP transmission, however those skilled in the art will appreciate that uplink CoMP transmission may be implemented as well. Shown in this figure are two eNodeBs, 410 and 412, which handle bidirectional wireless connections with UEs 414 and 418 over the E-UTRA interface (i.e., the LTE air interface). Optionally, the eNodeBs 410 and 412 may also handle connections to personal computers 416 and 420. The eNodeBs 410 and 412 are interconnected over an X2 interface for both user plane and control plane exchanges between eNodeBs. Optionally, in an alternate embodiment, the eNodeBs 410 and 412 may exchange information via a S1 interface via the MME 422, or any other interface known to those skilled in the art. For purpose of illustration only, the following examples are described with respect to an X2 interface. Referring back to FIG. 4, each eNodeB 410 and 412 is connected to a Mobile Management Entity (MME) 422 over a S1-MME interface and to a Serving Gateway (SGW) 424 over an S1-U interface. The MME 422 and SGW 424 are connected by a S11 interface and the MME 422 is connected to a Home Subscriber Server (HSS) 428 over an S6a interface. The SGW 424 in turn is connected to a Packet Data Network Gateway (PDNGW) 426 over an S5 interface, and the PDNGW 426 is connected to an Intranet 430, Internet 432, or other application specific network architectures 434 over a SGi interface.

Figure 5:
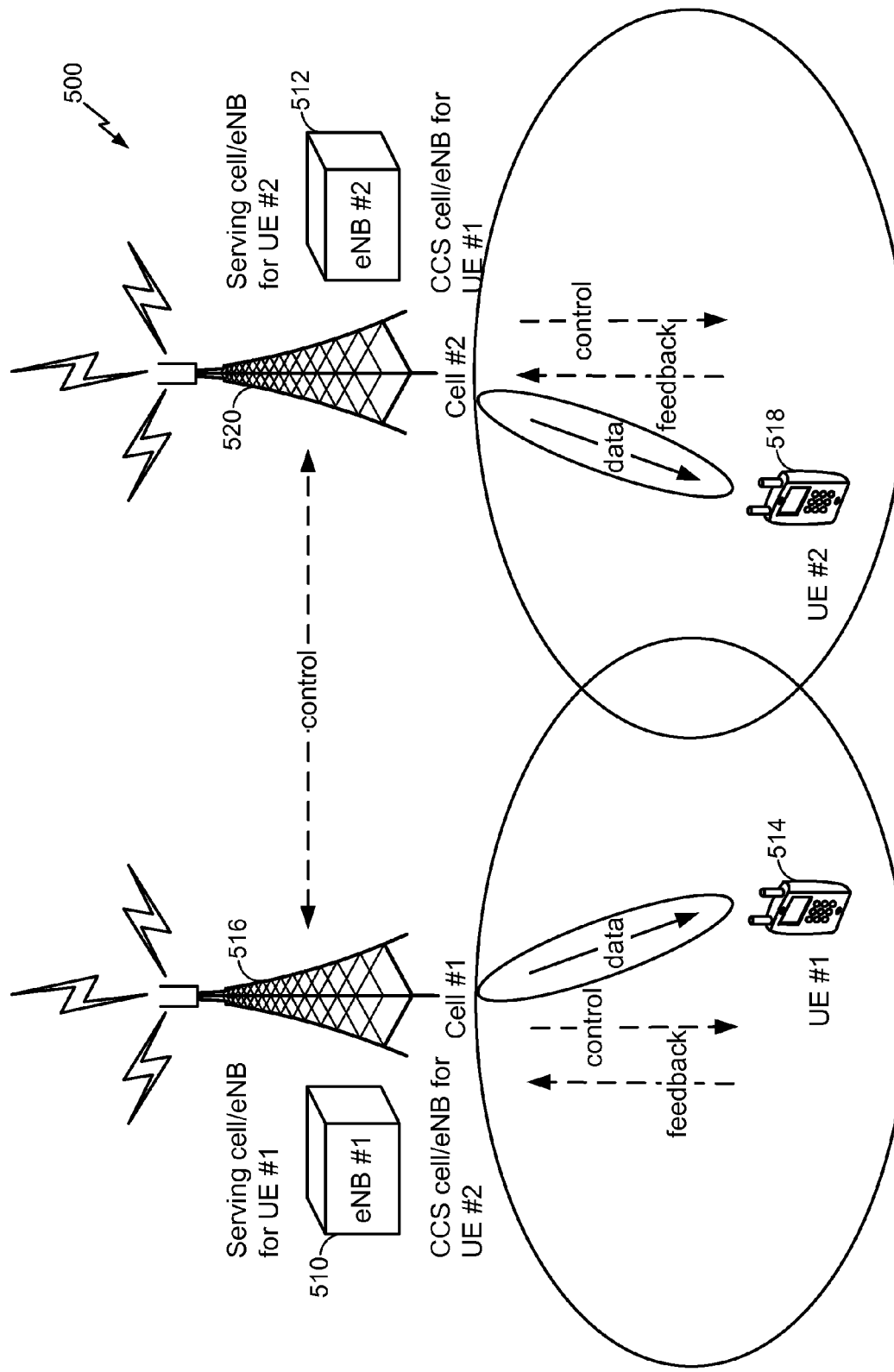
FIG. 5 illustrates an example downlink CoMP transmission scenario with coordinated scheduling/beam forming.

FIG. 5 illustrates an example downlink CoMP transmission scenario with coordinated scheduling/beamforming (CS/CB). In the example system 500, transmission is provided by eNodeBs 510 and 512 to UEs 514 and 518 respectively. In this example, only control information is transmitted between the two eNodeBs 510 and 512. In particular, scheduling data for the UEs 514 and 518 is sent back and forth between the eNodeBs 510 and 512 in order to determine the appropriate beam formation. For example, this allows for narrow beam configuration to reduce or minimize interference.

Figure 6:
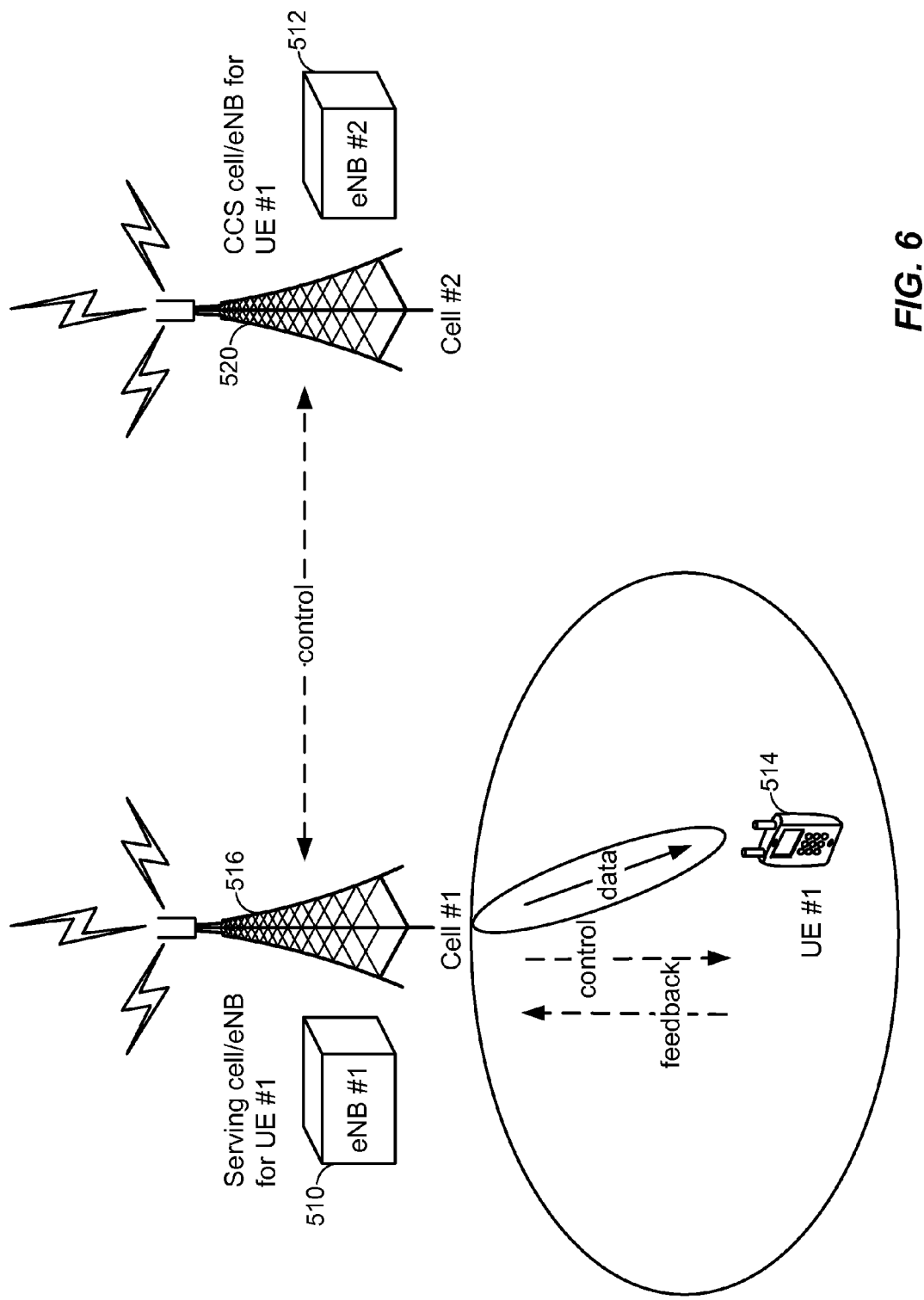
FIG. 6 illustrates an example downlink CoMP transmission scenario with dynamic cell selection.
Figure 7:
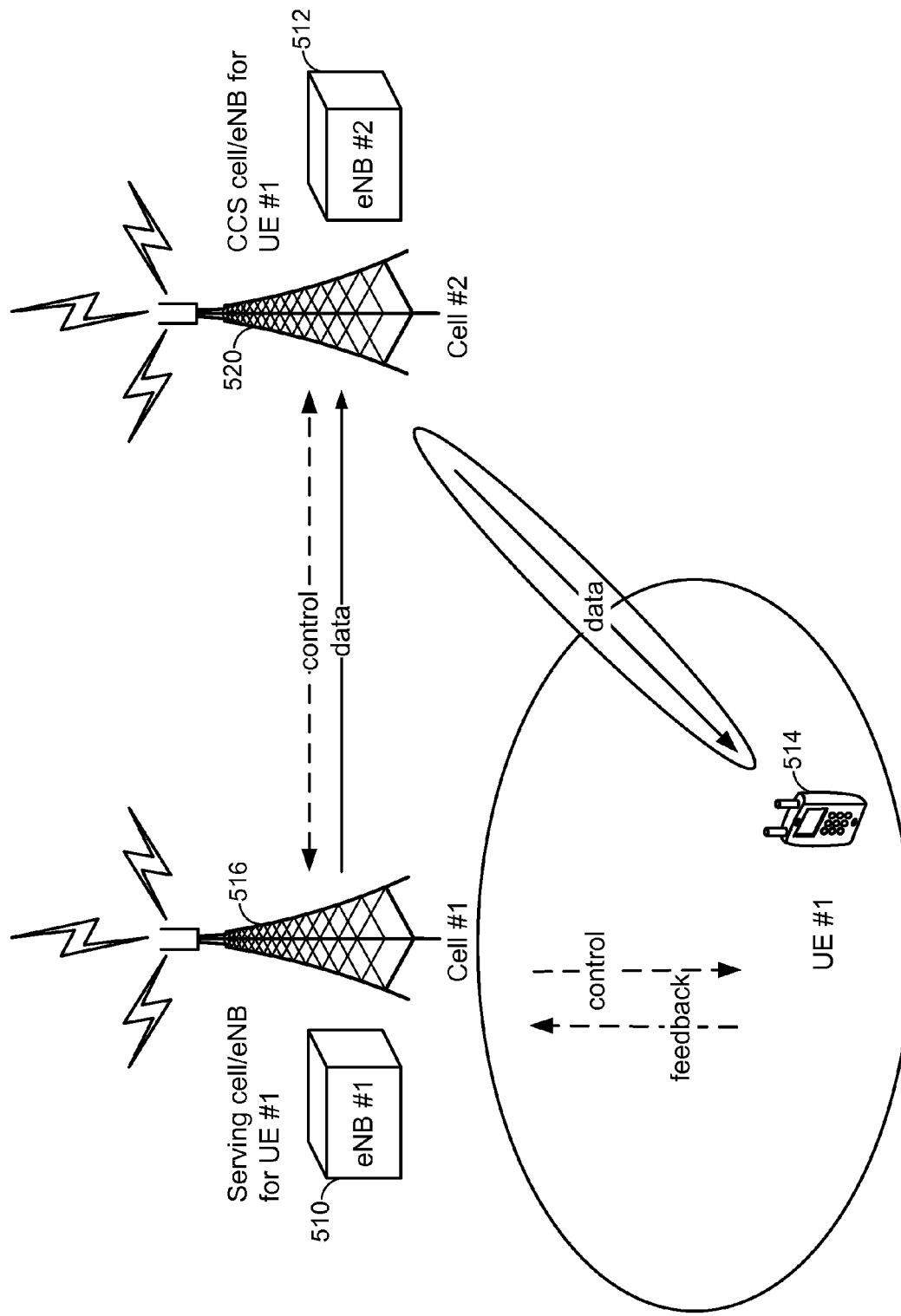
FIG. 7 illustrates another example downlink CoMP transmission scenario with dynamic cell selection.

FIGS. 6 and 7 illustrates examples of downlink CoMP transmission with dynamic cell selection (DCS). In dynamic cell selection, control information is exchanged between eNodeB 510 and eNodeB 512 to determine which cell is better suited to send data to the UE. In FIG. 6, the eNodeB 510 is transmitting to the UE 514 via a serving cell tower 516, because it was determined the serving cell tower 516 can obtain the best directed beam. In FIG. 7, the eNodeB 512 is providing transmission to the UE 514 via the cell tower 520, rather than utilizing the eNodeB 510 and the serving cell tower 516. In FIG. 7, both control and data messaging occurs between the eNodeBs 510 and 512, whereas in FIG. 6 only control messaging occurs between the eNodeBs.

Figure 8:
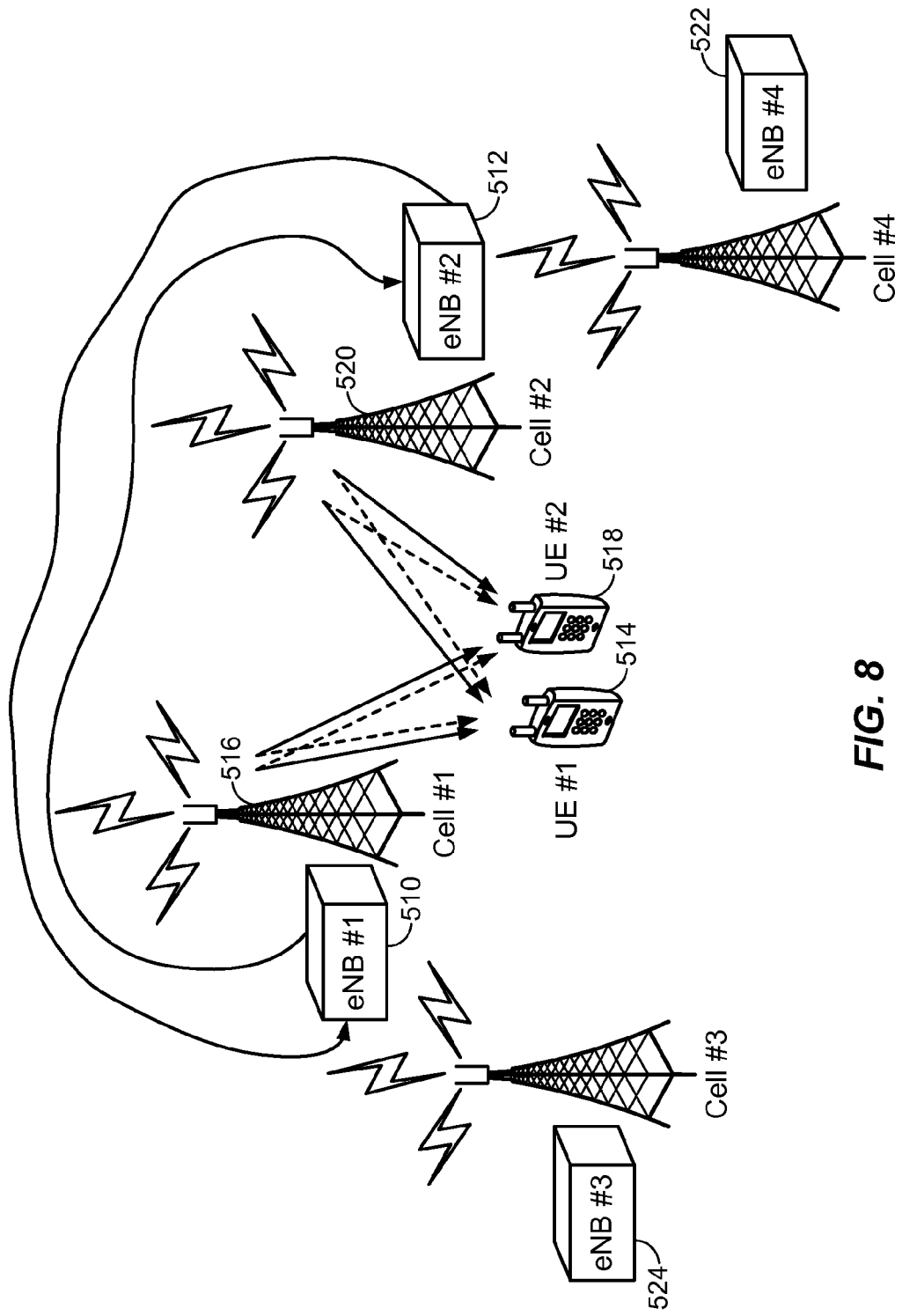
FIG. 8 illustrates an example downlink CoMP transmission scenario with joint transmission.

In FIG. 8, an example of a downlink CoMP transmission scenario with joint transmission (JT) is illustrated. Joint transmission refers to multiple downlink physical layer transmissions at a time from multiple transmission points to one or several UEs. In this example scenario, joint transmission is provided by two eNodeBs 510, 512 to two UEs 514 and 518. The joint transmission may provide improved transmission performance by enhanced spatial multiplexing or interference reduction through coordinated action by multiple eNodeBs. The other illustrated eNodeBs 522 and 524 are not involved in the transmissions.

In accordance with aspects of the disclosure, there are provided methods and apparatuses for long-term scaling power and residual interference estimation in Coordinated Multi-Point (CoMP) to improve rate prediction. The methods and systems generally relate to rate prediction in the context of a downlink CoMP framework or the like. More specifically, described herein are techniques for improving the quality of rate prediction by periodically feeding back at least one suitable indicator. In one embodiment, the at least one suitable indicator may be a channel gain estimation. In addition, or in the alternative, the at least one suitable indicator may comprise an interference estimation.

With respect to achieving downlink CoMP coherent transmission, nodes that are intended to cooperate in order to serve a given UE use short-term fading coefficients corresponding to links from the TX antennas involved in the transmission to the RX antennas of the UE. Therefore, contrary to standard cellular systems where each UE only estimates channels from its (single) serving node, in a CoMP scenario each UE should estimate channels from several nodes.

In particular, a measurement set (MS) of a given UE may be defined as the set of nodes that the given UE can measure (i.e., those nodes that are received with a large enough pilot signal-to-noise ratio). Each UE may have its own measurement set, the size of which may vary depending on, for example, the geographical location of the terminal and the network deployment.

It is noted that using all channels from all nodes in the measurement set may entail a large feedback overhead in the uplink, because those estimated channels would be periodically fed back to the anchor node. Accordingly, it may be desirable to prune the measurement set so as to bound the maximum feedback overhead in the uplink. For example, processes implemented in such a system may determine if the measurement set is larger than a given value, and if so, reduce the measurement set. The new reduced set may be referred to as a Radio Reporting Set (RRS).

Accordingly, each UE may measure all nodes it is able to sense, may build its own radio reporting set (which is smaller than or equal to the measurement set) based on predetermined criteria, such as a maximum uplink overhead, for example, and may feedback only those channels belonging to nodes in its radio reporting set. The radio reporting set can be used to quantify the maximum gain expected by using a CoMP technique, particularly because all power from those channels that are not reported (i.e., from nodes outside the radio reporting set of the considered UE) may contribute to the interference experienced by that UE.

Downlink CoMP framework entails cooperative transmission from multiple network nodes (e.g., access points, cells or eNBs) to User Equipment (UE) or multiple UEs so that inter-node interference is reduced/minimized and/or channel gain from multiple nodes is combined at the UE receiver. For a given practical cooperation algorithm, the exact amount of inter-node interference reduction and channel gain increase due to combining is unknown in advance, and may depend on the channels from both cooperating and interfering nodes, as well as on the scheduling decisions of neighbor nodes, and possibly other parameters related to the specific cooperation algorithm. For example, for a given UE and depending on the above mentioned conditions/factors, Multi-Point Equalizer (MPE) techniques may achieve full combining gain from all nodes in a radio reporting set of the UE, although in general the channel gain may be much smaller due to the fact that MPE may also take into consideration reducing interference to victim UEs. Because the number of cooperating antennas may be bounded, due to backhaul latency and computational complexity requirements, the degrees of freedom in the design of the equalizers may be limited, and some of the degrees of freedom may be spent for improving channel gain of the served UE, or for reducing inter-node interference to victim UEs.

The imperfect knowledge of the actual interference and channel gain experienced by a UE, due to the reasons mentioned above or the like, unavoidably leads to imperfect scheduling decisions. As a consequence, the fairness target may be grossly missed and/or the achieved average throughput values can be smaller than those achievable through an ideal scheduling. The aim of scheduling, which may be carried out independently at each node, is to predict, with the highest accuracy, the rate a given scheduling decision can achieve, taking into account concurrent transmissions to various UEs across cells, as well as the possibility of two or more UEs scheduled in the same resources by the same cell (e.g., Multi-User MIMO (MU-MIMO)) or UEs scheduled with rank ≥2 (e.g., Single-User MIMO (SU-MIMO)). Rate prediction may exploit the knowledge of the MIMO channels reported by all UEs associated with the node (which may be subject to estimation errors, latency, and finite quantization) to predict rates corresponding to various single-user and multi-user scheduling decisions. The above mentioned errors in the reported channels typically affect scheduling decisions. Even in the ideal presence of perfect channel state information at the node, the residual uncertainty on actual channel gain and residual inter-node interference may impact the quality of the rate prediction, thus negatively impact scheduling decisions and overall system performance. In one aspect, embodiments described herein provide techniques to improve the quality of rate prediction by periodically feeding back suitable indicators estimated at the UE.

Improving Channel Gain Estimation:

Known approaches for estimating the channel gain at the UE generally involve assuming that all nodes in the radio reporting set of the UE cooperate with the aim of increasing its own channel gain (i.e., maximum ratio combining (MRC)), or assuming that only the antennas at the anchor (serving) cell cooperate to pursue this goal. While the first approach is optimistic, because MRC gain is an upper bound of the actual channel gain, the latter has no physical meaning in the presence of any cooperating technique with joint transmission such as MPE, and it is difficult, if not impossible, to say in advance if the actual channel gain will be larger or smaller than the predicted value.

As described in the present disclosure, irrespective of the small-scale fading coefficients and of the scheduling decisions of neighbor nodes, it is proposed that the actual channel gain for a given UE is proportional to the MRC gain, whereas the proportionality or scaling factor depends on the UE long-term channel, it is almost independent of all other factors, namely small-scale channel coefficients and scheduling decisions of neighbor nodes. Using the above mentioned scaling factors would allow one to estimate the channel gain for each UE, by evaluating the MRC gain for the UE and applying the its corresponding scaling factor(s). For example, in one implementation, estimation and tracking of this scaling factor for a specific UE (denoted as $\mu$) at the UE side may be carried out in the following way:

Once small-scale channels from all nodes in the radio reporting set of the UE have been estimated, the corresponding MRC gain may be evaluated. If dual-stream transmission to the UE is allowed, the UE may evaluate MRC gain for both the streams, assuming suitable receive beams.

Once transmission is carried out, the UE may evaluate the actual average received power, which is a random quantity that depends on small-scale fading, the employed cooperative technique, scheduling decisions of nodes in the RRS, etc.

In order to reduce the feedback requirements, and because the scaling factor(s) μ are slowly varying, the UE can collect several consecutive values of the actual received power before evaluating and feeding back μ.

The value μ can be evaluated as the ratio between the actual received power and the MRC channel gain, and fed back to the anchor node with suitable quantization. If several transmissions have been collected, the average value may be taken. It is noted that the UE may collect and feed back one μ value for each possible scheduling scenario it can be involved in, namely: single-user rank-1, single-user ranks >1 (and in this case, one value of μ for each stream), and potentially multi-user rank-1 and/or rank >1. For example, the following four scenarios can be considered in a two-antenna system (meaning that the minimum between number of antennas at the RX and at the TX is 2): single-user rank-1μ, single-user rank-2 first stream $\mu_1$, single-user rank-2 second stream $\mu_2$, and multi-user rank-1μ. Alternatively, one single value μ may be estimated and fed back, irrespective of the scheduling scenario in which the UE is involved.

In one embodiment, the anchor node collects the μ values from all associated UEs and uses them to improve the predicted channel gain estimation, and correspondingly the predicted rate. In particular, a set of parameters ν may be defined in the log-domain, one for each UE and for each scenario:

All ν are initially set to 0 dB.

When one or more estimates of μ are fed back by a given UE, the corresponding internal ν parameters may be updated according to any suitable filtering technique, such as, for example, low-pass filtering or the like. In one embodiment, low-pass filtering may reduce the effects of noise in coefficients (e.g., μ) according to the exemplary equation:

ν=(1−α)ν+αμ, wherein α may be a suitably designed scaling factor between 0 and 1.

It is noted that a given ν may be updated with a μ corresponding to the same UE (and the same scenario, if multiple values have been fed back by the same UE, one for each scenario). If a single value is fed back by a given UE, all ν parameters corresponding to that UE may be updated using the only μ value received. It is noted that this first order filtering equation (ν=(1−α)ν+αμ) is merely exemplary and that other suitable filtering techniques known to one skilled in the art may be implemented. For example, other Infinite Impulse Response (IIR) filtering equations may be used to reduce the effects of noise in μ or the like.

MRC gain may be evaluated for each UE using the reported channel coefficients.

For each scenario that is considered, channel gains may be predicted by scaling the evaluated MRC gain by the ν factor corresponding to the UE(s) under consideration and the strategy type.

It is noted that the above described process defines an adaptive tracking process, with a stable working point corresponding to E{ν}=E{μ} for all UEs and scenarios, E{.} being the expectation operator. As for any closed-loop tracking algorithms, each may easily adapt to long-term channel variations or different system conditions, such as, for example, new UEs in the system. Parameter a controls the tradeoff between estimation accuracy and response to variations.

Tracking of Residual Interference:

Besides the channel gain described above, the residual inter-node interference at the UE is generally unknown, because the interference depends on how well the employed cooperation technique is able to suppress it. Besides the employed cooperation technique, other parameters may contribute to the actual inter-node interference experienced by a UE, as for instance actual small-scale fading channels, scheduling decisions of neighbor nodes, etc. Estimated interference may be used for rate prediction in the scheduling algorithm, but is generally employed also by the cooperating technique (e.g., for the cooperating node selection procedure). Thus, it is desirable to achieve good estimation accuracy for the interference as well.

Known approaches for estimating the interference level at a given UE may involve assuming that a given subset of nodes, usually those belonging to the radio reporting set of the considered UE, can be completely removed from the list of interferers of that UE. Thus, interference may be estimated as the sum of received powers from all nodes outside the radio reporting set, using long-term channel values only. Although this might be a good approximation, improved performance can be obtained by estimating the actual interference level at the UE and periodically reporting back the estimated value to the anchor node via an uplink channel. For example, a further refined approach may involve:

a) At the UE side, for each received data packet, evaluating or calculating the average power of the interference plus noise may be carried out based at least in part on UE-specific reference signals (UE-RSs) designed to ensure accurate channel and interference estimation for data demodulation. Optionally, the evaluating or calculating the average power of the interference plus noise may be performed after successfully decoding the received data packet, in case the estimation also relies on data tones.

b) The UEs may periodically feed back the last Q'≥1 estimated interference values with a suitable quantization;

c) Each node may receive interference estimates from associated UEs, and may store the last Q values (Q≥Q') in a circular buffer, one buffer for each associated UE; and d) An estimate of the average interference for each UE may be evaluated by averaging the available Q reported values at a given point in time. This estimate can be used, for example, by the employed cooperation techniques. On the other hand, all available values in the circular buffers (Q for each UE) may be jointly used by the scheduler for rate prediction according to the following rule: for a given strategy and a given UE involved in that strategy, predicted rate R is the arithmetic average of the Q predicted rates assuming, in sequence, the available Q estimates of the interference at that UE. When this average is carried out, the channel gain may be kept fixed and the technique described in the paragraphs under the heading "Improving Channel Gain Estimation" may be used for gain prediction.

With respect to the above description, it is noted that Q and Q' are design parameters that may control feedback overhead, memory requirements at both UEs and nodes, computational complexities at the nodes, and the response to long-term channel or system variations.

In accordance with one or more aspects of the embodiments described herein, the steps of the methodologies described above, in the paragraphs under the headings "Improving Channel Gain Estimation" and "Tracking of Residual Interference" may be performed at the UE. For example, the μ estimation loop may be run at the UE while the feedback (its channel component) is based on the short-term MRC gain multiplied by filtered μ, such that most or all of the processing is done at the UE.

Figure 9:
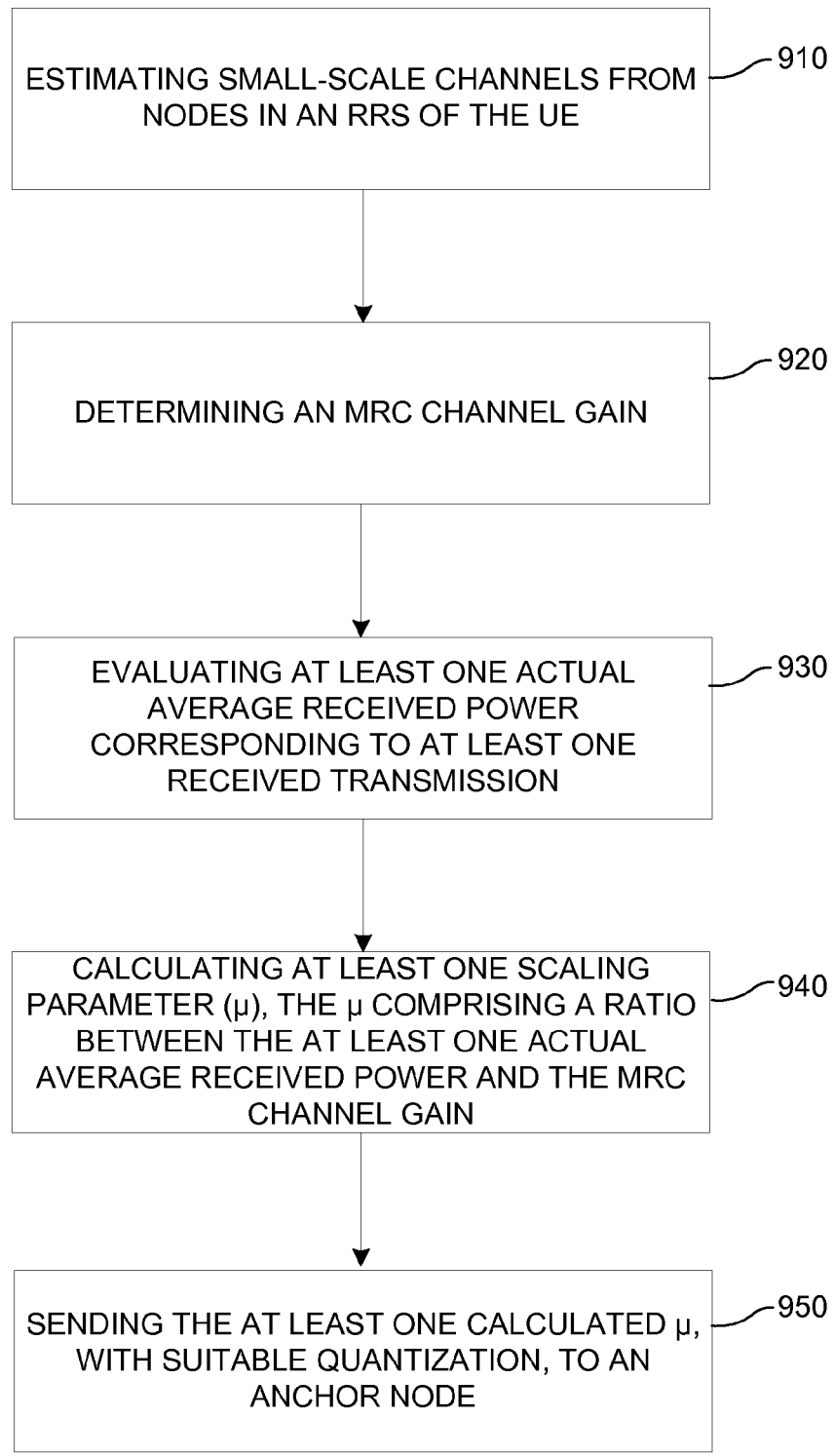
FIG. 9 illustrates one embodiment of a method for improving channel gain estimation at a User Equipment (UE).

In accordance with one or more aspects of the embodiments described herein, there is provided a method for improving channel gain estimation at a UE, and thereby improving rate prediction quality in a CoMP wireless communication system. With reference to the flow diagram shown in FIG. 9, there is provided a method 900 that may involve, at block 910, estimating small-scale channels from nodes in an radio reporting set of the UE. The method 900 may involve, at block 920, determining an MRC channel gain (e.g., based upon channel estimates based on pilot symbols or the like). The method 900 may involve, at block 930, evaluating at least one actual average received power corresponding to at least one received transmission, such as, for example, from at least one node. As previously indicated, the MRC is a theoretical gain which will differ from the actual average received power due to environmental factors, etc. At block 940, at least one scaling parameter ($\mu$) is calculated, the $\mu$ value being a ratio between the actual average received power(s) and the MRC channel gain. At block 950, the at least one calculated $\mu$, is sent with suitable quantization, to an anchor node.

In accordance with one or more aspects of the embodiments described herein, there is provided a method for improving channel gain estimation at a node for at least one associated UE, and thereby improving rate prediction. The method may generally involve: (a) defining one or more $\nu$ factors in the log-domain for each UE; (b) setting each $\nu$ factor to 0 dB or the like; (c) updating each $\nu$ factor according to a selected or defined IIR filtering equation (e.g., $\nu=(1-\alpha)\nu+\alpha\mu$) or the like; (d) evaluating a Maximum Ratio Combining (MRC) channel gain for each UE using any reported channels coefficients; (e) scaling the evaluated MRC channel gain by the $\nu$ factor to calculate a predicted channel gain; and (f) calculating a predicted rate based at least in part on the predicted channel gain. According to aspects of the present disclosure, the MRC determined by the eNB and the MRC determined by a UE in connection with determining $\mu$ will be substantially similar or the same.

Figure 10:
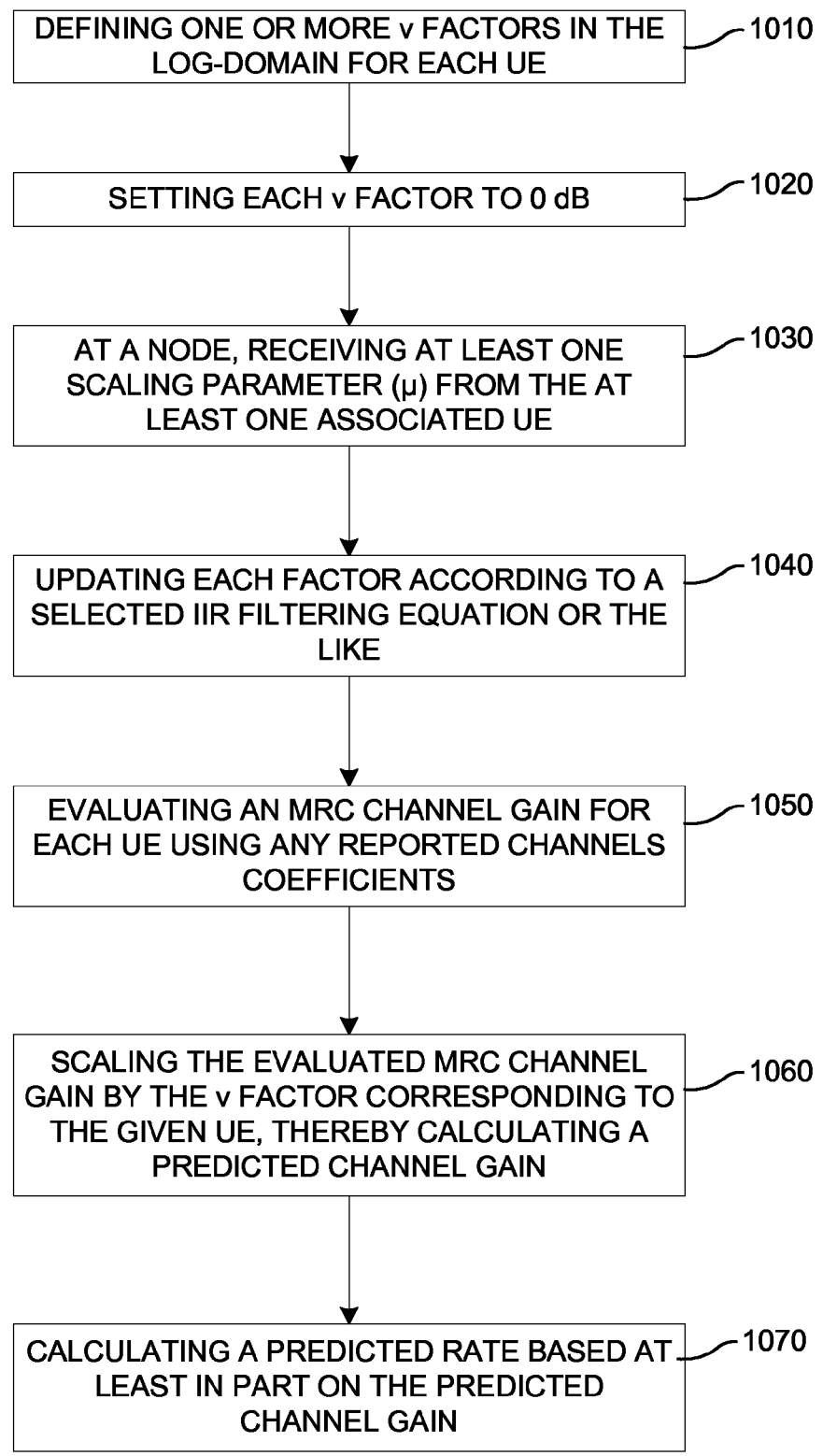
FIG. 10 illustrates one embodiment of a method for improving channel gain estimation at a node.

For example, with reference to the flow diagram shown in FIG. 10, there is provided an illustrative method 1000 that may involve, during an initialization (e.g., carried out while the UE initially registers itself in the system), defining one or more $\nu$ factors in the log-domain for each UE (block 1010), and setting each $\nu$ factor to 0 dB (block 1020). The method 1000 may involve, at block 1030, receiving at least one scaling parameter ($\mu$) from the associated UE(s). The method 1000 may involve, at block 1040, updating each $\nu$ factor according to the equation $\nu=(1-\alpha)\nu+\alpha\mu$. The parameter $\alpha$ controls a tradeoff between estimation accuracy and response to variations and is a scaling factor between 0 and 1. At block 1050, a Maximum Ratio Combining (MRC) channel gain is evaluated for each UE using any reported channels coefficients. At block 1060, for each scheduling scenario of a given UE, the evaluated MRC channel gain is scaled by the $\nu$ factor corresponding to the given UE, thereby calculating a predicted channel gain. The method may further involve calculating a predicted rate based at least in part on the predicted channel gain (block 1070). It is noted that blocks 1030-1070 may be continuously repeated while the UE remains in the system.

Figure 11:
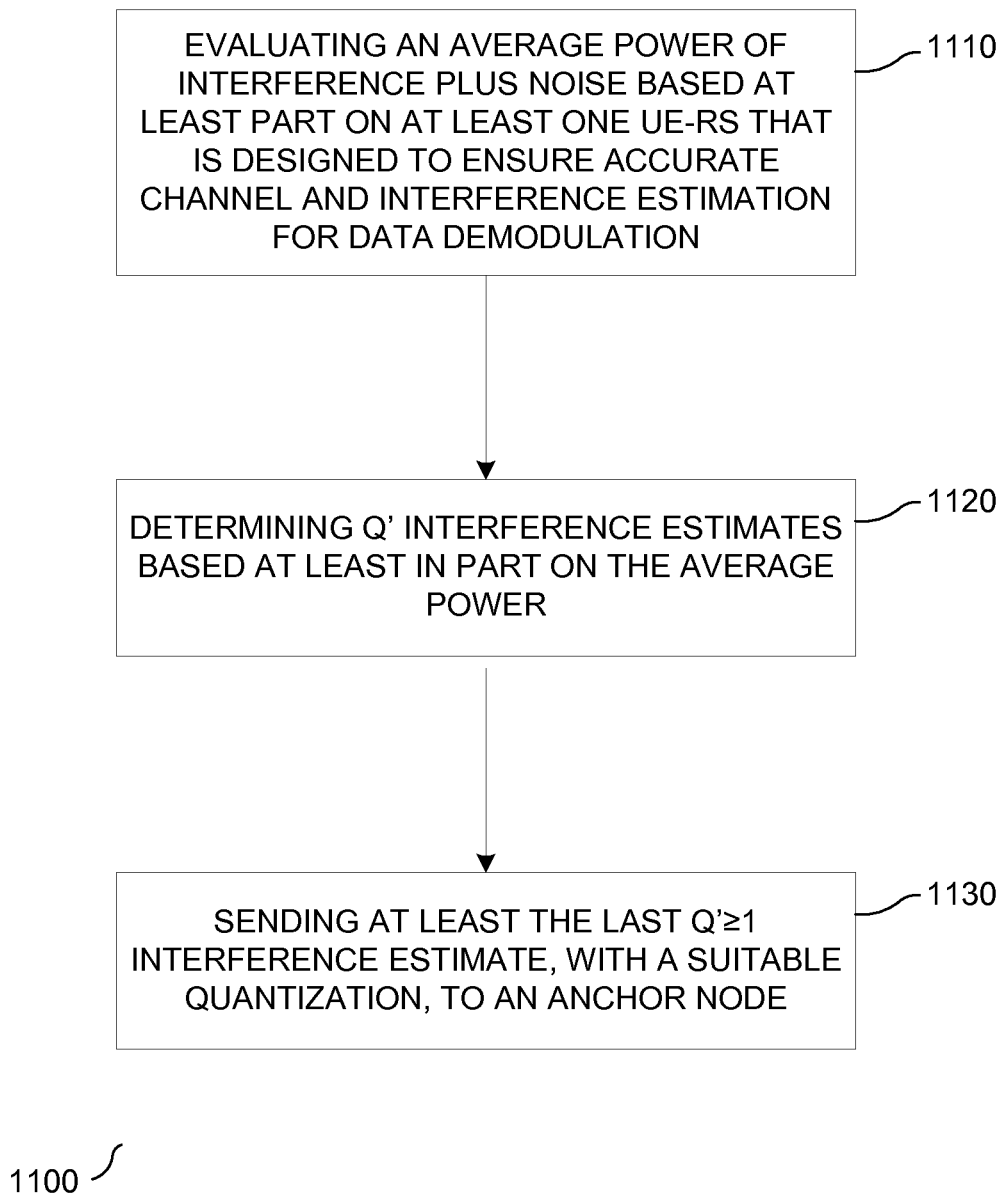
FIG. 11 illustrates another embodiment of a method for tracking residual interference at a UE.

In accordance with one or more aspects of the embodiments described herein, there is provided a method for tracking residual interference at a UE, and thereby improving rate prediction in a CoMP wireless communication system. With reference to the flow diagram shown in FIG. 11, there is provided a method 1100 that may involve, at block 1110, evaluating an average power of interference plus noise based at least in part on at least one UE-RS that is designed to ensure accurate channel and interference estimation for data demodulation. At block 1120, the Q' interference estimates are determined based at least in part on the average power of interference plus noise. The method 1100 may involve, at block 1130, sending at least the last Q'≥1 estimate of the interference, with a suitable quantization, to the anchor node.

Figure 12:
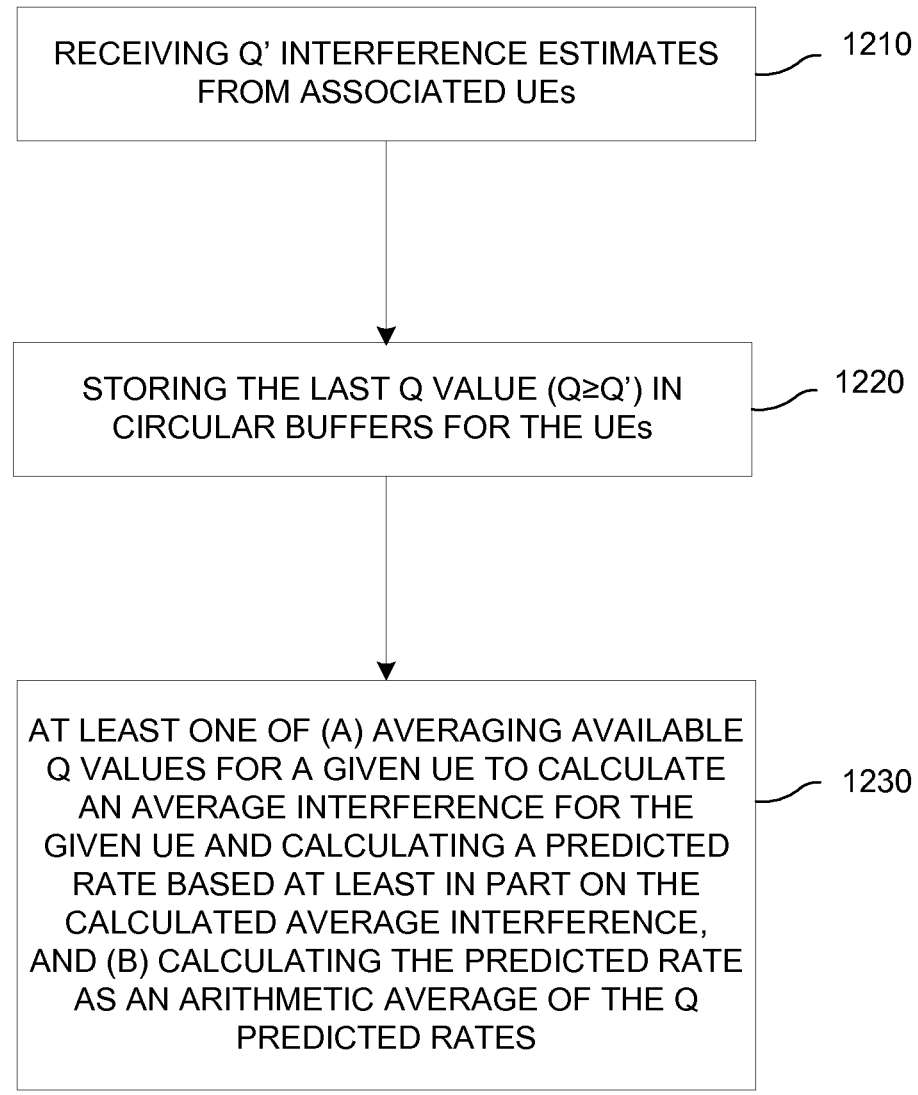
FIG. 12 illustrates one embodiment of a method for tracking residual interference at a nodeB.

In accordance with one or more aspects of the embodiments described herein, there is provided a method for tracking residual interference at a node, and thereby improving rate prediction. With reference to the flow diagram shown in FIG. 12 there is provided a method 1200 that may involve, at block 1210, receiving Q' interference estimates from associated UEs. At block 1220, the last Q values (Q≥Q') are stored in circular buffers for the UEs. In one embodiment, the method 1200 may involve averaging available Q values for a given UE to calculate an average interference for the given UE, and calculating a predicted rate based at least in part on the calculated average interference (block 1230). In the alternative, or in addition, the method 1200 may involve calculating the predicted rate as an arithmetic average of the Q predicted rates (block 1230).

Figure 13:
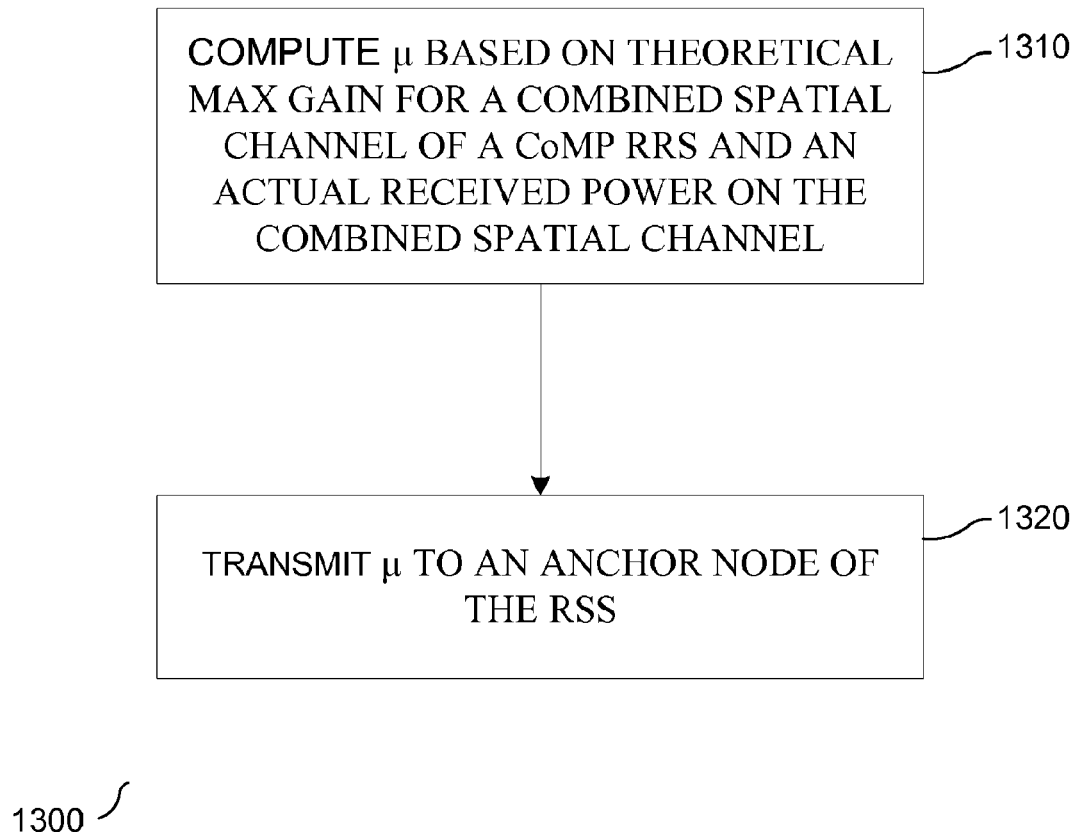
FIG. 13 illustrates one embodiment of a method for improving channel gain estimation at a User Equipment (UE).

In accordance with one or more aspects of the embodiments described herein, there is provided a method for improving channel gain estimation by a UE. With reference to the flow diagram shown in FIG. 13, there is provided a method 1300 that may involve, at block 1310, determining a gain scaling parameter ($\mu$) by a UE based on a theoretical maximum gain for a combined spatial channel of a Coordinated Multi-Point (CoMP) radio reporting set (RRS) of the user equipment (UE) and an actual received power for a transmission on the combined spatial channel and, at block 1320, transmitting the at least one gain scaling parameter ($\mu$) to at least one node of the radio reporting set.

Figure 14:
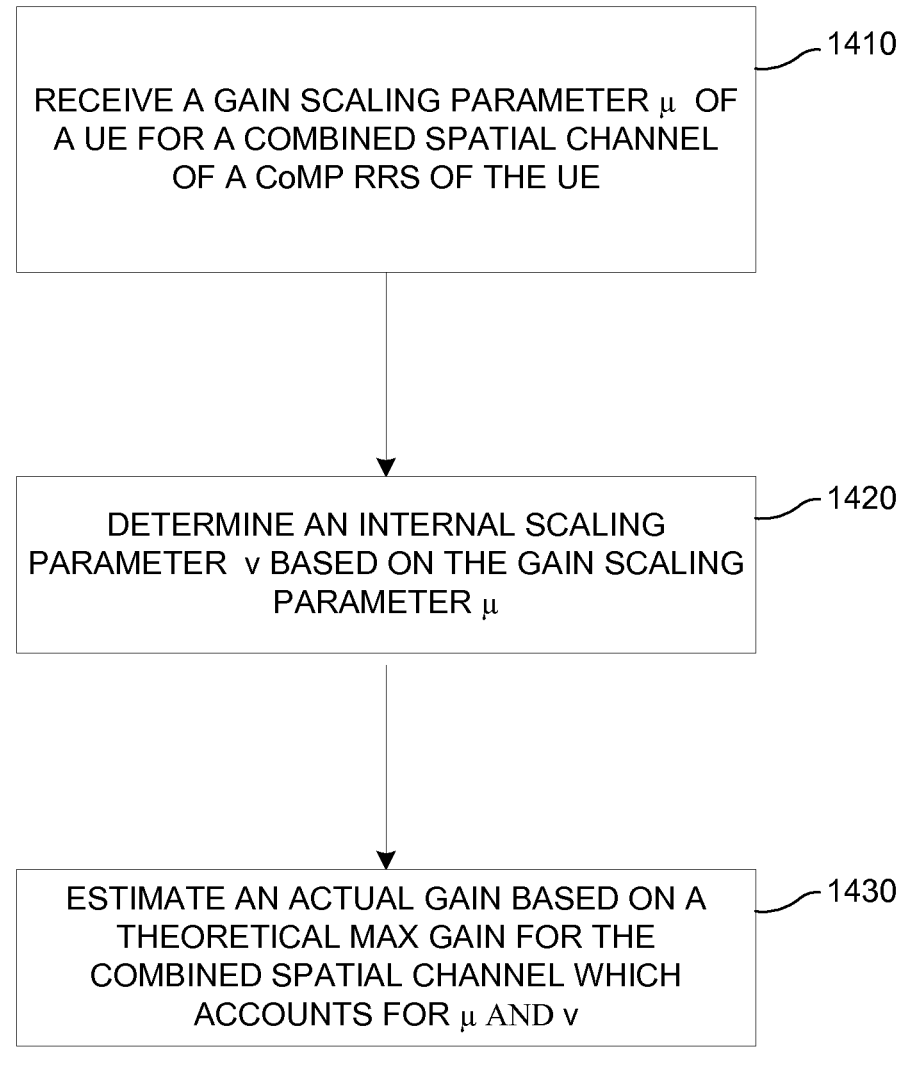
FIG. 14 illustrates one embodiment of a method for improving channel gain estimation at a nodeB.

In accordance with another aspect of the described embodiments, there is provided a method for improving channel gain estimation by an eNB. With reference to the flow diagram shown in FIG. 14, there is provided a method 1400 that may involve, at block 1410, receiving a gain scaling parameter ($\mu$) of a user equipment (UE) by an eNB for a combined spatial channel of a Coordinated Multi-Point (CoMP) radio reporting set (RRS) of the user equipment (UE). At block 1420, the eNB determines an internal scaling parameter ($\nu$) by the eNB, based on the gain scaling parameter ($\mu$). At block 1430, an actual gain is estimated by the eNB based on a theoretical maximum gain for the combined spatial channel, which accounts for the received gain scaling parameter ($\mu$), and the internal scaling parameter ($\nu$).

Figure 15:
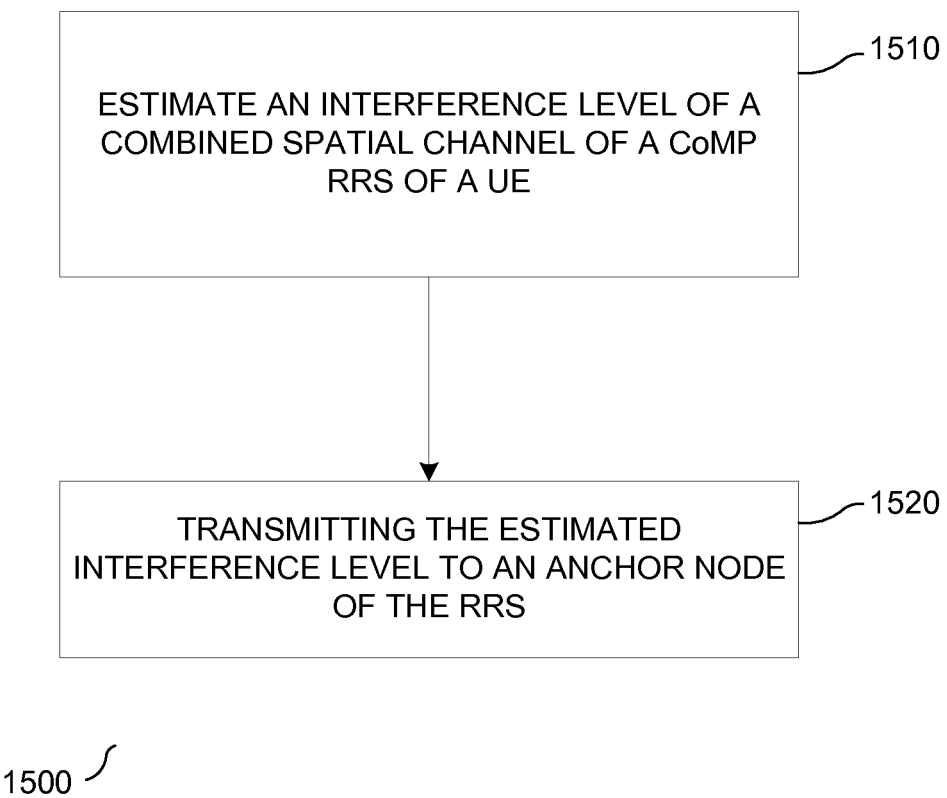
FIG. 15 illustrates another embodiment of a method for tracking residual interference at a UE.

In accordance with one or more aspects of the described embodiments, there is provided a method for tracking interference by a UE. With reference to the flow diagram shown in FIG. 15, there is provided a method 1500 that may involve, at block 1510, estimating by the UE, an interference level of a combined spatial channel of a Coordinated Multi-Point (CoMP) radio reporting set (RRS) of the UE. At block 1520, the UE transmits to an anchor node one or more quantized estimated interference levels.

Figure 16:
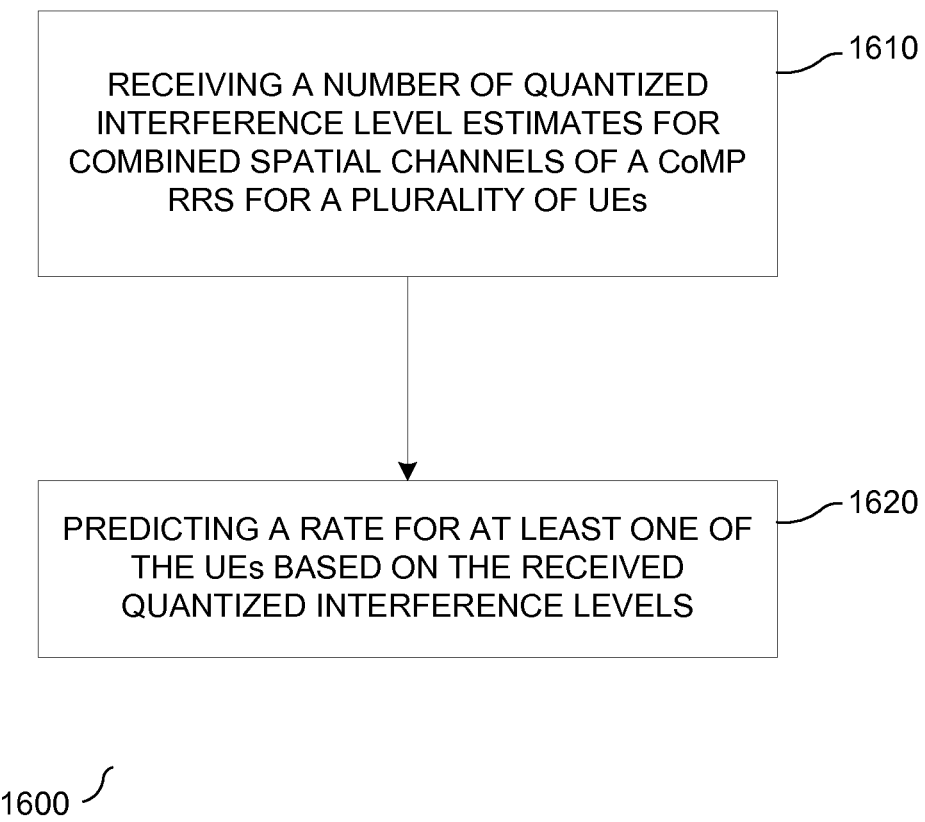
FIG. 16 illustrates one embodiment of a method for tracking residual interference at a nodeB.

In accordance with one or more aspects of the described embodiments, there is provided a method for tracking interference by an eNB. With reference to the flow diagram shown in FIG. 16, there is provided a method 1600, that may involve, at block 1610, receiving a number of quantized interference level estimates by the eNB for combined spatial channels of a Coordinated Multi-Point (CoMP) radio reporting set (RRS) for multiple equipments (UEs). At block 1620, the eNB predicts a rate by for at least one of the UEs based on the received quantized interference level estimates.

In one configuration, the UE 120 is configured for wireless communication including means, such as the receive processor 258 or the controller/processor 280, for determining, and means, such as the transmit processor 264, for transmitting the gain scaling parameter (μ) to at least one node of the radio reporting set. In another configuration, the UE 120 is configured for wireless communication including means for estimating an interference level; and means for transmitting to an anchor node one or more quantized estimated interference levels, such as the receive processor 258 or the controller/processor 280.

In one configuration, the eNB 110 is configured for wireless communication including means, such as the receive processor 238, for receiving at least one gain scaling parameter (μ) of a user equipment (UE), means such as the scheduler 244, for determining an internal scaling parameter (v) based on the gain scaling parameter (μ), and means, such as the scheduler 244, for estimating an actual gain based on a theoretical maximum gain for the combined spatial channel, which accounts for the received gain scaling parameter (μ), and the internal scaling parameter (v). In another configuration, the eNB 110 is configured for wireless communication including means for receiving quantized interference level estimates, and means for predicting a rate for at least one of the UEs based on the received quantized interference level estimates, such as the scheduler 244.

In one aspect, the aforementioned means may be any module or any apparatus configured to perform the functions recited by the aforementioned means. In one embodiment, the UE sends both gain and interference estimates to an eNB and the eNB predicts a rate based on both the gain and interference estimates.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    determining by a user equipment (UE), at least one gain scaling parameter (μ) associated with a combined spatial channel of a Coordinated Multi-Point (CoMP) radio reporting set (RRS) of the UE based on:
        a theoretical maximum gain of the combined spatial channel; and
        an actual received power for a transmission on the combined spatial channel; and
    transmitting the at least one gain scaling parameter (μ) to at least one node of the radio reporting set.

2. The method of claim 1, comprising:
    determining by the UE, a separate gain scaling parameter (μ) for each of a plurality of scheduling strategies involving the UE.

3. The method of claim 2, the scheduling strategies including single user rank 1 scheduling, single user rank >1 scheduling, multi-user rank 1 scheduling, multi-user rank >1 scheduling, and further including separate strategies for each rank >1 stream.

4. The method of claim 1, comprising:
filtering the at least one gain scaling parameter (µ) by the UE before transmitting the at least one gain scaling parameter to the at least one node of the radio reporting set.

5. The method of claim 1, further comprising:
determining the theoretical maximum gain by determining a maximum ratio combining (MRC) channel gain of the combined spatial channel.

6. A method of wireless communication, comprising:
receiving by an eNB, at least one gain scaling parameter (µ) associated with a combined spatial channel of a Coordinated Multi-Point (CoMP) radio reporting set (RRS) of the user equipment (UE);
determining by the eNB, an internal scaling parameter (v), based on the at least one gain scaling parameter (µ); and
estimating by the eNB, an actual gain for the combined spatial channel based on a theoretical maximum gain of the combined spatial channel and the internal scaling parameter (v).

7. The method of claim 6, further comprising:
updating the internal scaling parameter (v) for each of a plurality of gain scaling parameters of the UE received by the eNB.

8. The method of claim 6, comprising:
predicting at the eNB a channel power for the UE by scaling a maximum power of all nodes in the RRS by the internal scaling parameter (v) corresponding to the at least one gain scaling factor (µ) of the UE.

9. A method of wireless communication, comprising:
receiving, by a user equipment (UE), a plurality of data packets;
estimating, by the UE, at least one interference level of a combined spatial channel of a Coordinated Multi-Point (CoMP) radio reporting set (RRS) of the UE based on the received data packets; and
transmitting to an anchor node the at least one estimated interference level.

10. The method of claim 9, comprising:
estimating the interference level by the UE based on a UE-specific reference signal.

11. A method of wireless communication, comprising:
receiving a plurality of quantized interference level estimates by an eNB for combined spatial channels of a Coordinated Multi-Point (CoMP) radio reporting set (RRS) for a plurality of user equipments (UEs); and
predicting a rate by the eNB for at least one of the plurality of UEs based on the received quantized interference level estimates.

12. The method of claim 11, comprising:
predicting the rate by the eNB based on an average signal to interference plus noise ratio (SINR) evaluated by averaging the quantized interference level estimates for each UE.

13. The method of claim 11, comprising:
predicting the rate by the eNB based on an average of predicted rates of the UE, one predicted rate for each stored interference value.

14. The method of claim 11, comprising:
selecting a set of UEs among a set of associated UEs available for scheduling; and
scheduling the selected UEs according to the predicted rates.

15. An apparatus for wireless communication comprising:
at least one processor; and
a memory coupled to the at least one processor, the at least one processor being configured:
to compute, at least one gain scaling parameter (µ) associated with a combined spatial channel of a Coordinated Multi-Point (CoMP) radio reporting set (RRS) of a user equipment (UE) based on a theoretical maximum gain and an actual received power for a transmission on the combined spatial channel; and
to transmit the at least one gain scaling parameter (µ) to at least one node of the radio reporting set.

16. The apparatus of claim 15, in which the at least one processor is further configured:
to compute, a separate gain scaling parameter (µ) for each of a plurality of scheduling strategies involving the UE.

17. The apparatus of claim 16, the scheduling strategies including single user rank 1 scheduling, single user rank >1 scheduling, multi-user rank 1 scheduling, multi-user rank >1 scheduling, and further including separate strategies for each rank >1 stream.

18. The apparatus of claim 15, in which the at least one processor is further configured:
to filter the at least one gain scaling parameter (µ) before transmitting the at least one gain scaling parameter to the at least one node of the radio reporting set.

19. The apparatus of claim 15, in which the at least one processor is further configured:
to determine the theoretical maximum gain by determining a maximum ratio combining (MRC) channel gain of the combined spatial channel.

20. An apparatus for wireless communication comprising:
at least one processor; and
a memory coupled to the at least one processor, the at least one processor being configured:
to receive at least one gain scaling parameter (µ) of a user equipment (UE) for a combined spatial channel of a Coordinated Multi-Point (CoMP) radio reporting set (RRS) of the user equipment (UE)
to determine an internal scaling parameter (v) by the eNB, based on the at least one gain scaling parameter (µ); and
to estimate an actual gain for the combined spatial channel based on a theoretical maximum gain of the combined spatial channel and the internal scaling parameter (v).

21. The apparatus of claim 20, in which the at least one processor is further configured:
to update the internal scaling parameter (v) for each of a plurality of received gain scaling parameters of the UE.

22. The apparatus of claim 20, in which the at least one processor is further configured:
to predict channel power for a particular UE by scaling a maximum power of all nodes in the RRS by the internal scaling parameter (v) corresponding to the at least one gain scaling factor (µ) of the particular UE.

23. An apparatus for wireless communication comprising:
at least one processor; and
a memory coupled to the at least one processor, the at least one processor being configured:
to receive a plurality of data packets;
to estimate at least one interference level of a combined spatial channel of a Coordinated Multi-Point (CoMP) radio reporting set (RRS) based on the plurality of data packets; and to transmit to an anchor node one or more quantized estimated interference levels based on the at least one estimated interference levels.

24. The apparatus of claim 23, in which the at least one processor is further configured:
to estimate the interference level based on a UE specific reference signal.

25. An apparatus for wireless communication comprising:
at least one processor; and
a memory coupled to the at least one processor, the at least one processor being configured:
to receive a plurality of quantized interference level estimates for combined spatial channels of a Coordinated Multi-Point (CoMP) radio reporting set (RRS) for a plurality of user equipments (UEs); and
to predict a rate for at least one of the UEs based on the received quantized interference level estimates.

26. The apparatus of claim 25, in which the at least one processor is further configured:
to predict the rate based on an average signal to interference plus noise ratio (SINR) evaluated by averaging the quantized interference level estimates for each UE.

27. The apparatus of claim 25, in which the at least one processor is further configured:
to predict the rate based on an average of predicted rates of the UE, one predicted rate for each stored interference value.

28. The apparatus of claim 25, in which the at least one processor is further configured:
to select a set of UEs among a set of associated UEs available for scheduling; and
to schedule the selected UEs according to the predicted rates.

29. A system for wireless communication, comprising:
means for determining by a UE, at least one gain scaling parameter ($\mu$) associated with a combined spatial channel of a Coordinated Multi-Point (CoMP) radio reporting set (RRS) of a user equipment (UE) based on a theoretical maximum gain and an actual received power for a transmission on the combined spatial channel; and
means for transmitting the at least one gain scaling parameter ($\mu$) to at least one node of the radio reporting set.

30. A system for wireless communication, comprising:
means for receiving by an eNB, at least one gain scaling parameter ($\mu$) of a user equipment (UE) for a combined spatial channel of a Coordinated Multi-Point (CoMP) radio reporting set (RRS) of the user equipment (UE);
means for determining by the eNB, an internal scaling parameter (v) by the eNB, based on the at least one gain scaling parameter ($\mu$); and
means for estimating by the eNB, an actual gain for the combined spatial channel based on a theoretical maximum gain for the combined spatial channel and the internal scaling parameter (v).

31. A system for wireless communication, comprising:
means for receiving, by a user equipment (UE), a plurality of data packets;
means for estimating, by a user equipment (UE), an interference level of a combined spatial channel of a Coordinated Multi-Point (CoMP) radio reporting set (RRS) of the UE based on the plurality of data packets; and
means for transmitting to an anchor node one or more quantized estimated interference levels.

32. A system for wireless communication, comprising:
means for receiving a plurality of quantized interference level estimates by an eNB for combined spatial channels of a Coordinated Multi-Point (CoMP) radio reporting set (RRS) for a plurality of user equipments (UEs); and
means for predicting a rate by the eNB for at least one of the plurality of UEs based on the received quantized interference level estimates.

33. A computer program product for wireless communications in a wireless network, comprising:
a computer-readable medium having program code recorded thereon, the program code comprising:
program code to compute by a UE, at least one gain scaling parameter ($\mu$) associated with a combined spatial channel of a Coordinated Multi-Point (CoMP) radio reporting set (RRS) of a user equipment (UE) based on a theoretical maximum gain and an actual received power for a transmission on the combined spatial channel; and
program code to transmit the at least one gain scaling parameter ($\mu$) to at least one node of the radio reporting set.

34. A computer program product for wireless communications in a wireless network, comprising:
a computer-readable medium having program code recorded thereon, the program code comprising:
program code to receive by an eNB, at least one gain scaling parameter ($\mu$) of a user equipment (UE) for a combined spatial channel of a Coordinated Multi-Point (CoMP) radio reporting set (RRS) of the user equipment (UE)
program code to determine by the eNB, an internal scaling parameter (v) by the eNB, based on the at least one gain scaling parameter ($\mu$); and
program code to estimate by the eNB, an actual gain for the combined spatial channel based on a theoretical maximum gain for the combined spatial channel and the internal scaling parameter (v).

35. A computer program product for wireless communications in a wireless network, comprising:
a computer-readable medium having program code recorded thereon, the program code comprising:
program code to receive, by a user equipment (UE), a plurality of data packets;
program code to estimate, by the UE, at least one interference level of a combined spatial channel of a Coordinated Multi-Point (CoMP) radio reporting set (RRS) of the UE; and
program code to transmit to an anchor node one or more quantized estimated interference levels based on the at least one estimated interference levels.

36. A computer program product for wireless communications in a wireless network, comprising:
a computer-readable medium having program code recorded thereon, the program code comprising:
program code to receive a plurality of quantized interference level estimates by an eNB for combined spatial channels of a Coordinated Multi-Point (CoMP) radio reporting set (RRS) for a plurality of user equipments (UEs); and
program code to predict a rate by the eNB for at least one of the plurality of UEs based on the received quantized interference level estimates.

* * * * *